United States Patent
Jeon et al.

(10) Patent No.: US 9,035,006 B2
(45) Date of Patent: *May 19, 2015

(54) OLEFIN BLOCK COPOLYMER AND SHEET-SHAPED MOLDED BODY

(75) Inventors: Sang-Jin Jeon, Daejeon (KR); Seung-Ki Park, Daejeon (KR); Kyung-Seop Noh, Daejeon (KR); Nan-Young Lee, Seoul (KR); Won-Hee Kim, Daejeon (KR); Sang-Eun An, Daejeon (KR)

(73) Assignee: LG CHEM, LTD., Seoul (KR)

( * ) Notice: Subject to any disclaimer, the term of this patent is extended or adjusted under 35 U.S.C. 154(b) by 73 days.

This patent is subject to a terminal disclaimer.

(21) Appl. No.: 13/980,869

(22) PCT Filed: Jan. 19, 2012

(86) PCT No.: PCT/KR2012/000493
§ 371 (c)(1),
(2), (4) Date: Jul. 19, 2013

(87) PCT Pub. No.: WO2012/099415
PCT Pub. Date: Jul. 26, 2012

(65) Prior Publication Data
US 2013/0303704 A1    Nov. 14, 2013

(30) Foreign Application Priority Data

Jan. 20, 2011 (KR) .......... 10-2011-0006049
Jan. 18, 2012 (KR) .......... 10-2012-0005863

(51) Int. Cl.
*C08F 210/16* (2006.01)
*C08F 295/00* (2006.01)
*C08J 5/18* (2006.01)
*C08F 297/08* (2006.01)
*C08F 301/00* (2006.01)

(52) U.S. Cl.
CPC ............ *C08F 295/00* (2013.01); *C08F 301/00* (2013.01); *C08F 2500/10* (2013.01); *C08F 210/16* (2013.01); *C08J 5/18* (2013.01); *C08F 297/08* (2013.01); *C08J 2323/16* (2013.01)

(58) Field of Classification Search
CPC ... C08F 2500/10; C08F 301/00; C08F 210/16
See application file for complete search history.

(56) References Cited

U.S. PATENT DOCUMENTS

2006/0199030 A1    9/2006  Liang et al.
2010/0113698 A1*   5/2010  Walton et al. .......... 525/88

FOREIGN PATENT DOCUMENTS

| CN | 1671756 A | 9/2005 |
| KR | 10-2001-0030929 | 4/2001 |
| KR | 10-2007-0112192 | 11/2007 |
| KR | 10-2010-0104564 | 9/2010 |
| KR | 10-2010-0126712 | 12/2010 |
| WO | 2009097560 A1 | 8/2009 |
| WO | WO 2010/039628 | 4/2010 |
| WO | WO 2011/010891 | 1/2011 |

* cited by examiner

*Primary Examiner* — Richard A Huhn
(74) *Attorney, Agent, or Firm* — McKenna Long & Aldridge LLP

(57) ABSTRACT

The present description relates to an olefin block copolymer preferably useful to form nonslip pads due to excellences in elasticity and heat resistance, and a sheet-shaped molded body comprising the olefin block copolymer The olefin block copolymer includes a plurality of blocks or segments, each of which includes an ethylene or propylene repeating unit and an α-olefin repeating unit at different weight fractions. The olefin block copolymer satisfies a defined relationship when a load of 5 to 10 kg is applied to a sheet-shaped molded body of the block copolymer for 12 hours or longer at a temperature of 60° C. or higher, and then removed.

14 Claims, No Drawings

OLEFIN BLOCK COPOLYMER AND SHEET-SHAPED MOLDED BODY

This application is a National Stage entry of International Application No. PCT/KR2012/000493, filed on Jan. 19, 2012, which claims priority to Korean Patent Application Nos. 10-2011-0006049, filed on Jan. 20, 2011 and 10-2012-0005863, filed on Jan. 18, 2012, with the Korean Patent Office, all of which are incorporated herein in their entirety by reference.

TECHNICAL FIELD

The present invention relates to an olefin block copolymer and a sheet-shaped molded body comprising the olefin block copolymer.

BACKGROUND

Typically, a stand for electronic appliances, such as advanced TVs or laptop computers, is provided with a nonslip pad for prevention or inhibition of slipping of the electronic appliances. Such a stand is chiefly made of a rubber material, but alternative materials are under consideration due to a short supply of the rubber material.

PVC or SEBS which is a hydrogenated triblock copolymer of styrene and butadiene has been considered as a substitute for rubber materials. However, the use of PVC has been restricted because of the high plasticizer content of PVC that causes environmental risks. SEBS which contains a relatively large amount of oil possibly causes the oil seeping through the stand supporting a heavy-weighted electronic appliance. As such, those alternative materials are supposed to have a limit in their use.

Recently, there has been an attempt to use olefin-based elastomers as a substitute for rubber materials. With benefits of considerable elasticity, low price, and extensive usefulness, the olefin-based elastomers are expected to be used as a substitute for rubber materials.

The nonslip pad supporting an electronic appliance is supposed to stand high temperature of a predetermined level or above caused by the heat coming from the electronic appliance and thus required to have heat resistance and elasticity to some extent. Primarily consisting of a random copolymer of ethylene and α-olefin monomers, the olefin-based elastomers are disadvantageously poor in heat resistance. Accordingly, there is a limitation in the use of olefin-based elastomers as a substitute for rubber materials for nonslip pads or the like.

SUMMARY

It is an object of the present invention to provide an olefin block copolymer preferably useful to form a nonslip pad because of its excellent elasticity and heat resistance.

It is another object of the present invention to provide a sheet-shaped molded body comprising the olefin block copolymer.

In accordance with an embodiment of the present description, there is provided an olefin block copolymer comprising a plurality of blocks or segments, each comprising an ethylene or propylene repeating unit and an α-olefin repeating unit at different weight fractions, where the olefin block copolymer satisfies the following Mathematical Formula 1 when a load of 5 to 10 kg is applied to a sheet-shaped molded body of the block copolymer for 12 hours or longer at a temperature of 60° C. or higher, and then removed:

$$60\% \geq \{(T_0 - T)/T_0\} \times 100\% \qquad \text{[Mathematical Formula 1]}$$

In the Mathematical Formula 1, $T_0$ is the initial thickness of the sheet-shaped molded body of the block copolymer; and T is the thickness of the sheet-shaped molded body after removal of the load.

The olefin block copolymer of the embodiment may comprise a hard segment comprising a first weight fraction of the α-olefin repeating unit and a soft segment comprising a second weight fraction of the α-olefin repeating unit, where the second weight fraction is greater than the first weight fraction. In the olefin block copolymer of the embodiment, the weight fraction of the α-olefin repeating unit contained in the entire block copolymer may have a value between the first and second weight fractions.

The olefin block copolymer of the embodiment may comprise 10 to 90 wt. % of the hard segment and a remaining content of the soft segment.

In the olefin block copolymer of the embodiment, the hard segment may have a higher value than the soft segment in at least one property of the degree of crystallization, density, and melting temperature.

The olefin block copolymer of the embodiment may comprise 30 to 90 wt. % of the ethylene or propylene repeating unit and a remaining content of the α-olefin repeating unit.

The olefin block copolymer may have a density of 0.85 to 0.92 g/cm$^3$; a melt index of 0.5 to 5 g/10 min under a load of 2.16 kg at 190° C.; and a Shore hardness of 50 to 100. Further, the olefin block copolymer may have a permanent recovery (after 300% elongation) of 100% or less and a TMA (Thermal Mechanical Analysis) value of 70 to 140° C. The olefin block copolymer may have a melting temperature of 100 to 140° C.

The olefin block copolymer of the embodiment may have a weight average molecular weight of 50,000 to 200,000 and a molecular weight distribution of 2.0 to 4.5.

In accordance with another embodiment of the present invention, there is provided a sheet-shaped molded body comprising the olefin block copolymer. The sheet-shaped molded body may be used for a nonslip pad, such as, for example, a nonslip pad for electronic appliances.

DETAILED DESCRIPTION OF THE EMBODIMENTS

Hereinafter, a detailed description will be given as to the olefin block copolymer and a sheet-shaped molded body comprising the olefin block copolymer according to the embodiments of the present description and the production method thereof. However, these embodiments are provided as a mere illustration and not intended to limit the scope of the invention. Moreover, it is apparent to those skilled in the art that the embodiments may be modified in many ways.

Unless stated otherwise, some terms as used in the entire specification may be defined as follows.

The term "(olefin) block copolymer" as used herein refers to a copolymer of ethylene or propylene and α-olefin, where the copolymer comprises a plurality of blocks or segments of repeating units that are distinguishable from one another in terms of at least one property of, for example, the content (weight fraction) of the repeating unit derived from ethylene (or propylene), the content (weight fraction) of the repeating unit from α-olefin, the degree of crystallization, density, or melting temperature.

A plurality of such blocks or segments may comprise, for example, an ethylene or propylene repeating unit and an α-olefin repeating unit, on the condition that the contents (weight fractions) of the repeating units are different from each other. For example, a plurality of the blocks or the segments may comprise a hard segment which is a hard crystalline block comprising a first weight fraction of the α-olefin, and a soft segment which is a soft elastic block comprising a second weight fraction of the α-olefin, where the second weight fraction is greater than the first weight fraction. In this regard, the first weight fraction may be lower than the weight fraction of the α-olefin repeating unit as measured for the entire block copolymer, while the second weight fraction may be higher than the weight fraction of the α-olefin repeating unit for the entire block copolymer.

In addition, a plurality of the blocks or segments may be distinguishable from one another in terms of at least one property selected from the degree of crystallization, density, and melting point. In comparison with the soft segment which is a soft elastic block, for example, the hard segment which is a hard crystalline block may have a higher value in terms of at least one or two properties of the degree of crystallization, density, and melting temperature.

On the other hand, the olefin block copolymer according to one embodiment of the present invention may be defined by the after-mentioned relationship between density and TMA (Thermal Mechanical Analysis) values in addition to the properties, such as the weight fractions of the ethylene or propylene repeating unit and the α-olefin repeating unit constituting the olefin block copolymer, the degree of crystallization of each block or segment, density, or melting temperature.

Such an olefin block copolymer of the embodiment may comprise a plurality of blocks or segments, each of which comprises an ethylene or propylene repeating unit and an α-olefin repeating unit at different weight fractions, where the olefin block copolymer satisfies the following Mathematical Formula 1 when a load of 5 to 10 kg is applied to a sheet-shaped molded body of the block copolymer for 12 hours or longer at a temperature of 60° C. or higher, and then removed:

$$60\% \geq \{(T_0-T)T_0\} \times 100\% \quad \text{[Mathematical Formula 1]}$$

In the Mathematical Formula 1, $T_0$ is the initial thickness of the sheet-shaped molded body of the block copolymer; and T is the thickness of the sheet-shaped molded body after removal of the load.

The olefin block copolymer of the embodiment, which contains repeating units derived from ethylene or propylene and α-olefin by copolymerization, may benefit from the inclusion of the α-olefin repeating unit derived from α-olefin to have good elasticity.

Even when a load of about 5 to 10 kg, specifically about 5 kg is applied to a sheet-shaped molded body of the block copolymer for about 12 hours or longer, for example, about 12 to 30 hours, specifically about 24 hours at a temperature of about 60° C. or higher, for example, about 60 to 80° C., specifically about 60° C., and then removed, the sheet-shaped molded body has a recovery to the original shape and thickness, satisfying the Mathematical Formula 1. More specifically, the recovery measurement can be acquired by applying a load to the sheet-shaped molded body having a size of about 50-500 mm×50-500 mm, specifically about 100 mm×100 mm, and then removed. In other words, the value defined by the Mathematical Formula 1 for the sheet-shaped molded body of the olefin block copolymer of the embodiment can be about 60% or less, for example, about 0 to 60%, about 10 to 50%, about 20 to 40%, or about 30 to 50%. The Mathematical Formula 1 implies that the olefin block copolymer maintains good properties even at high temperature to exhibit excellence in elasticity and heat resistance at once.

Such a good heat resistance presumably results from the fact that the block copolymer of the embodiment has a blocked form.

As the block copolymer is prepared in the presence of the after-mentioned specific catalyst system, it has a blocked form of a plurality of blocks or segments distinct in physical or chemical properties from one another. More specifically, such a block copolymer may include a plurality of blocks or segments of an ethylene or propylene repeating unit and an α-olefin repeating unit at different weight fractions. For example, the block copolymer may have a blocked form comprising hard segments which are hard crystalline blocks comprising a first weight fraction of the α-olefin repeating unit, and soft segments which are soft elastic blocks comprising a second weight fraction of the α-olefin repeating unit. In this regard, the weight fraction of the α-olefin repeating unit included in the entire block copolymer has a value between the first and second weight fractions. In other words, the first weight fraction can be lower than the weight fraction of the α-olefin repeating unit calculated for the entire block copolymer, while the second weight fraction is higher than the weight fraction of the α-olefin repeating unit calculated for the entire block copolymer.

In this manner, the olefin block copolymer of the embodiment has such a blocked form comprising a plurality of blocks or segments. In particular, as the block copolymer includes hard segments of the hard crystalline blocks with higher weight fraction of the ethylene or propylene repeating unit, it has a higher TMA (Thermal Mechanical Analysis) value, for example, about 70 to 140° C., about 80 to 130° C., or about 90 to 120° C. than the conventional olefin-based elastomers. In addition, the block copolymer of the embodiment may have a high melting temperature Tm, for example, about 100 to 140° C., about 110 to 130° C., or about 120 to 130° C. Thus, the block copolymer of the embodiment shows excellent properties such as good elasticity as an elastomer even at higher temperature, consequently with enhanced heat resistance. In this regard, the TMA value is a property value representing heat resistance of the olefin block copolymer and can be measured with TMA measurement equipment, such as, for example, TMA Q400 manufactured by TA Instruments. The specific TMA measurement method and conditions are apparent to those skilled in the art and described in the after-mentioned examples.

Accordingly, the olefin block copolymer of the embodiment can exhibit enhanced heat resistance as well as good elasticity pertaining to copolymerization of α-olefin, making it possible to provide olefin-based elastomers with good elasticity and heat resistance. Therefore, such an olefin block copolymer can be used as a substitute for rubber materials and preferably applied to nonslip pads, such as for electronic appliances.

On the other hand, a plurality of blocks or segments contained in the block copolymer of the embodiment, such as, for example, hard segments and soft segments are distinguishable from one another by at least one of the properties of the degree of crystallization, density, or melting temperature. For example, the hard segment which is the hard crystalline block comprising an ethylene or propylene repeating unit at higher weight fraction may have a higher value in at least one properties of the degree of crystallization, density, melting point, and the like, in comparison with the soft segment which is the soft elastic block comprising an α-olefin repeating unit at higher weight fraction. This presumably results from the higher crystallinity of the hard segments. Such blocks or segments can be characterized and/or classified by preparing a (co)polymer corresponding to each block or segment and measuring its properties.

For the olefin block copolymer of the embodiment, the melt index under a load of 2.16 kg at 190° C. is about 0.5 to 5 g/10 min, about 0.5 to 4.5 g/10 min, about 0.7 to 4.0 g/10 min, or about 0.7 to 3.7 g/10 min, and the Shore hardness is about 50 to 100, about 60 to 90, or about 60 to 85. As the block copolymer has such levels of melt index and Shore hardness, it exhibits good mechanical properties and high processability as a material preferably applicable to nonslip pads, such as for all types of electronic appliances such as TVs or laptop computers.

In addition, the olefin block copolymer of the embodiment may have a permanent recovery in the range of about 100% or less, about 10 to 80%, about 15 to 70%, or about 20 to 60%. In this regard, the permanent recovery can be determined from the results of a tensile test performed on a molded body of the block copolymer according to the following Mathematical Formula 2:

$$\text{Permanent recovery}(\%) = \{(L-L_0)/L_0\} \times 100 \quad \text{[Mathematical Formula 2]}$$

In the Mathematical Formula 2, $L_0$ denotes the initial length of the molded body of the block copolymer; and L denotes the length of the molded body recovered from at least 300% deformation, for example, 300% elongation.

The permanent recovery is defined as the degree of recovery to the original form or length from deformation imposed by an external force. When the permanent recovery after 300% elongation is about 100% or less, the block copolymer of the embodiment is considered to have good elasticity. Particularly, the block copolymer of the embodiment has good heat resistance even at high temperature as already described above, so it is much preferably applicable to nonslip pads, such as for electronic appliances.

The block copolymer of the embodiment may comprise the ethylene or propylene repeating unit at a content of about 30 to 90 wt. %, about 50 to 85 wt. %, or about 60 to 90 wt. %. Also, the block copolymer may comprise the above-defined content of the ethylene or propylene repeating unit and a remaining content (i.e., about 10 to 70 wt. %, about 15 to 50 wt. %, or about 10 to 40 wt. %) of the α-olefin repeating unit. As the block copolymer comprises such a content of the α-olefin repeating unit, it can have good elasticity as an elastomer and hence contain the ethylene or propylene repeating unit at an optimized content range to secure good heat resistance.

Further, the block copolymer of the embodiment may comprise about 10 to 90 wt. %, about 20 to 85 wt. %, or about 25 to 80 wt. % of the hard segment and a remaining content (i.e., about 10 to 90 wt. %, about 15 to 80 wt. %, or about 20 to 75 wt. %) of the soft segment.

In this regard, the weight fraction of the hard segment can be calculated with a time domain NMR (TD NMR) instrument commercially available. More specifically, the TD NMR instrument is used to determine the free induction decay (FID) for a sample of the block copolymer, where the FID is expressed as a function of time and intensity. In the following Mathematical Formula 3, four constants, A, B, $T2_{fast}$, and $T2_{slow}$ are varied to elicit a functional formula most approximating the graph of the above-mentioned FID function and thereby to determine the constant values for the sample, such as A, B, $T2_{fast}$, and $T2_{slow}$. For reference, the T2 (spin-spin relaxation time) relaxation for the hard segment as calculated from the functional formula appears fast, while the T2 relaxation for the soft segment is slow. Among the calculated values of A, B, $T2_{fast}$, and $T2_{slow}$, the lower T2 value is determined as the T2 value of the hard segment, that is, $T2_{fast}$, while the higher T2 value is determined as the T2 value of the soft segment, that is, $T2_{slow}$. This process enables it to calculate the content (wt. %) of the hard segment as well as the constants of A and B.

$$\text{Intensity} = A \times \text{EXP}(-\text{Time}/T2_{fast}) + B \times \text{EXP}(-\text{Time}/T2_{slow}) \quad \text{[Mathematical Formula 3]}$$

Determine A, B, $T2_{fast}$, and $T2_{slow}$ by fitting.

$$\text{Hard segment (wt. \%)} = A/(A+B) \times 100$$

In the Mathematical Formula 3, intensity and time are values calculated through the FID analysis; $T2_{fast}$ is the T2 (spin-spin relaxation time) relaxation value for the hard segment; and $T2_{slow}$ is the T2 (spin-spin relaxation time) relaxation value for the soft segment. A and B, which are constants determined by the fitting process, indicate the relative proportions of the hard and soft segments, respectively, and have values proportionate to the contents of the respective segments.

As described above, among a plurality of blocks or segments constituting the block copolymer, the hard segment means a hard crystalline segment having a higher content of the ethylene or propylene repeating unit and contributes to the excellent heat resistance of the block copolymer. The soft segment which is included at a remaining content in the block copolymer means a soft elastic segment having a higher content of the α-olefin repeating unit and contributes to the elasticity of the block copolymer. As the block copolymer of the embodiment comprises the hard and soft segments in the defined content range, it can exhibit excellent heat resistance and adequate elasticity as an elastomer.

The block copolymer may have a weight average molecular weight of about 50,000 to 200,000, about 60,000 to 180,000, or about 70,000 to 150,000, and a molecular weight distribution of about 2.0 or greater (e.g., about 2.0 to 4.5, about 2.0 to 4.0, about 2.0 to 3.5, or about 2.3 to 3.0). Further, the block copolymer of the embodiment may have a density of about 0.85 to 0.92 g/cm$^3$, 0.86 to 0.90 g/cm$^3$, or 0.86 to 0.89 g/cm$^3$. As the block copolymer has such levels of molecular weight, molecular weight distribution, and density, it can show appropriate properties as an olefin-based elastomer, such as, for example, good mechanical properties and high processability.

The block copolymer may be a block copolymer comprising an ethylene or propylene repeating unit (for example, an ethylene repeating unit) and an α-olefin repeating unit. In this regard, the α-olefin repeating unit may be a repeating unit derived from α-olefins, such as 1-butene, 1-pentene, 4-methyl-1-pentene, 1-hexene, 1-heptene, 1-octene, 1-decene, 1-undecene, 1-dodecene, 1-tetradecene, 1-hexadecene, or 1-itocene.

The olefin block copolymer of the embodiment can exhibit good elasticity due to the inclusion of the α-olefin repeating unit, and good heat resistance pertaining to a high degree of blocking. Therefore, the block copolymer of the embodiment can be used in a wider range of applications requiring heat resistance, overcoming the limitations of olefin-based elastomers in regards to the range of applications.

The block copolymer of the embodiment may be used substantially in all the applications in which the conventional elastomers have been adopted. Moreover, the block copolymer of the embodiment can be used in a wider range of applications to which the conventional olefin-based elastomers are substantially not applicable because of their poor heat resistance. For example, the block copolymer of the embodiment is used to form different kinds of products, including automobile parts or interior materials, such as bumpers, trimming parts, etc.; packaging materials; insulating materials; household products, such as shoe soles, toothbrush grips, flooring materials, knobs, etc.; adhesives, such as pressure-sensitive adhesives, hot melting adhesives, etc.; hoses; pipes; and so forth and adopted in a variety of other applications and uses.

Particularly, the sheet-shaped molded body comprising the block copolymer of the embodiment benefits from the good elasticity and heat resistance of the block copolymer to support an electronic appliance such as TV or laptop computer at high temperature caused by the heat generated from the electronic appliance while maintaining its original shape and elasticity. Therefore, the sheet-shaped molded body can be preferably used as a substitute for rubber materials to form nonslip pads, such as for electronic appliances. The sheet-shaped molded body can be produced by molding the olefin block copolymer of the embodiment into a sheet by a known molding method for olefin resins, where the olefin block copolymer may be used in combination with known additives or other resins.

On the other hand, the olefin block copolymer may be used in presence with a specific catalyst system (i.e., catalyst composition). More specifically, the olefin block copolymer can be prepared by copolymerizing monomers including an ethylene or propylene monomer and an α-olefin monomer, in the presence of a catalyst composition for olefin polymerization comprising a transition metal compound having a structure that a compound represented by the following Chemical Formula 1 as a ligand forms a coordinate covalent bond to a Group IV transition metal and a compound represented by the following Chemical Formula 2:

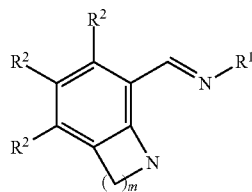

[Chemical Formula 1]

In the Chemical Formula 1, m is an integer from 1 to 7;

$R^1$ is a $C_4$-$C_{10}$ cycloalkyl group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic; a $C_3$-$C_9$ heterocyclic group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic, and containing oxygen (O), nitrogen (N), or sulfur (S) as a hetero-atom; a $C_6$-$C_{10}$ aryl group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic; or a $C_5$-$C_{10}$ hetero-aryl group having at least one substituent selected from the group consisting of hydrogen, deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, and $C_4$-$C_{20}$ heterocyclic, and containing oxygen (O), nitrogen (N), or sulfur (S) as a hetero-atom, where when $R^1$ has at least two substituents, the adjacent two groups forms an aliphatic or aromatic condensed ring; and $R^2$s are the same or different from one another and independently selected from hydrogen, deuterium, halogen, nitrile, acetylene, amine, amide, ester, ketone, $C_1$-$C_{20}$ alkyl, $C_2$-$C_{20}$ alkenyl, $C_6$-$C_{20}$ aryl, $C_4$-$C_{20}$ heterocyclic, $C_1$-$C_{20}$ alkoxy, and $C_6$-$C_{20}$ aryloxy, where at least two $R^2$ are linked to each other to form an aliphatic or aromatic ring.

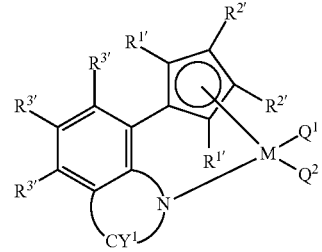

[Chemical Formula 2]

In the Chemical Formula 2, $R^{1'}$ is $R^{2'}$ are independently hydrogen, $C_1$-$C_{20}$ alkyl, $C_6$-$C_{20}$ aryl, silyl, $C_2$-$C_{20}$ alkenyl, $C_7$-$C_{20}$ alkylaryl, $C_7$-$C_{20}$ arylalkyl, or Group 14 metalloid radical having a hydrocarbyl substituent, where $R^{1'}$ and $R^{2'}$ are linked to each other via an alkylidyne radical containing a $C_1$-$C_{20}$ alkyl group or an aryl group to form a ring;

$R^3$s are independently hydrogen, halogen, $C_1$-$C_{20}$ alkyl, $C_6$-$C_{20}$ aryl, $C_1$-$C_{20}$ alkoxy, $C_6$-$C_{20}$ aryloxy, or amido, where at least two $R^3$s are linked to each other to form an aliphatic or aromatic ring;

$CY^1$ is a substituted or unsubstituted aliphatic or aromatic ring;

M is a Group IV transition metal; and $Q^1$ and $Q^2$ are independently halogen, $C_1$-$C_{20}$ alkyl, $C_6$-$C_{20}$ arylamido, $C_2$-$C_{20}$ alkenyl, $C_6$-$C_{20}$ aryl, $C_7$-$C_{20}$ alkylaryl, $C_7$-$C_{20}$ arylalkyl, or $C_1$-$C_{20}$ alkylidene.

Among the substituents of the Chemical Formulas 1 and 2, the alkyl group includes a linear or branched alkyl group; the alkenyl group includes a linear or branched alkenyl; the silyl group includes trimethylsilyl, triethylsilyl, tripropylsilyl, tributylsilyl, trihexylsilyl, triisopropylsilyl, triisobutylsilyl, triethoxysilyl, triphenylsilyl, tris(trimethylsilyl)silyl, or the like; the aryl group includes a hetero-aryl group as well as a $C_6$-$C_{20}$ aryl group. Specific examples of the aryl group may include phenyl, naphthyl, anthracenyl, pyridyl, dimethyla-nilinyl, anisoryl, etc. The alkylaryl group refers to an aryl group having the alkyl group as a substituent.

Among the substituents of the Chemical Formulas 1 and 2, the arylalkyl group is an alkyl group having the aryl group as a substituent; the halogen group is a fluorine group, a chlorine group, a bromine group, or an iodine group; the alkylamino group is an amino group having the alkyl group as a substituent, where the specific examples of the amino group include a dimethylamino group, diethylamino group, etc.; and the arylamino group is an amino group having the aryl group as a substituent, where the specific examples of the arylamino group include a diphenylamino group, etc. However, the specific examples of each group are not limited to those mentioned above.

In the preparation method for the block copolymer, the transition metal compound derived from a compound of the Chemical Formula 1 as a ligand contained in the catalyst composition prefers involving polymerization and coupling of the ethylene or propylene monomer to form a hard segment, while the compound of the Chemical Formula 2 primarily involves polymerization and coupling of the α-olefin monomer to form a soft segment. Therefore, the use of the catalyst composition leads to interactions of those two catalysts in alternately forming the hard segment having a lower content of the α-olefin repeating unit and the soft segment having a higher content of the α-olefin repeating unit, thereby providing an olefin bock copolymer with a higher degree of blocking than the conventional copolymers. Such an olefin block copolymer particularly satisfies the above-described relationship as given by the Mathematical Formula 1, consequently with excellences in elasticity and heat resistance and enhanced processability relative to the conventional block copolymers. Thus, the block copolymer makes it possible to provide olefin-based elastomers applicable to a wide range of applications, including nonslip pads.

Furthermore, the use of the catalyst composition provides a block copolymer with excellent heat resistance at high productivity through a relatively simple process of preparation, greatly contributing to the commercialization of olefin-based elastomers with good heat resistance.

Hereinafter, a further detailed description will be given as to the catalyst composition and a preparation method for the olefin block copolymer using the catalyst composition.

Firstly, the compound of the Chemical Formula 1 can be a compound represented by the following Chemical Formula 1-1 or 1-2:

[Chemical Formula 1-1]

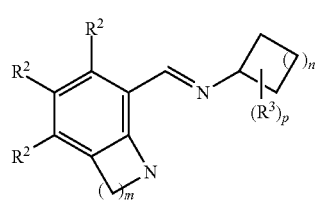

[Chemical Formula 1-2]

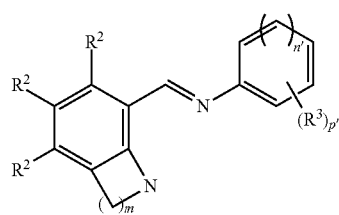

In the Chemical Formula 1-1 or 1-2, m and $R^2$ are as defined in the Chemical Formula 1; n is an integer from 1 to 7; n' is an integer from 1 to 5; p is an integer from 0 to 2+n; p' is an integer from 0 to 5+n'; and $R^3$s are the same or different from one another and independently selected from deuterium, halogen, nitrile, acetylene, amine, amide, ester, ketone, $C_1$-$C_{20}$ alkyl, $C_6$-$C_{20}$ cycloalkyl, $C_2$-$C_{20}$ alkenyl, $C_6$-$C_{20}$ aryl, silyl, $C_7$-$C_{20}$ alkylaryl, $C_7$-$C_{20}$ arylalkyl, or $C_4$-$C_{20}$ heterocyclic, where at least two $R^3$s are linked to each other to form an aliphatic or aromatic ring. For a more specific example, $R^3$ is $C_1$-$C_{20}$ alkyl, $C_6$-$C_{20}$ cycloalkyl, $C_2$-$C_{20}$ alkenyl, or $C_6$-$C_{20}$ aryl, where at least two $R^3$s are linked to each other to form an aliphatic or aromatic ring.

In the Chemical Formula 1-1 or 1-2, for another specific example, m is 2 or 3; n is 2 or 3; and n" is from 1 to 3.

Specific examples of the compound of the Chemical Formula 1 may include at least one selected from the group consisting of the compounds represented by the following Chemical Formula 1-3:

[Chemical Formula 1-3]

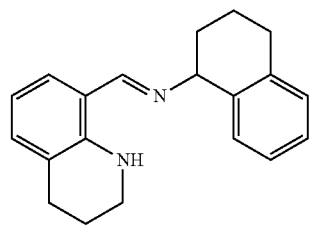

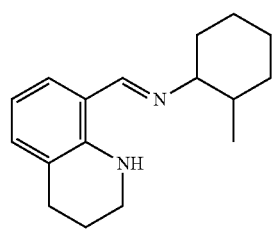

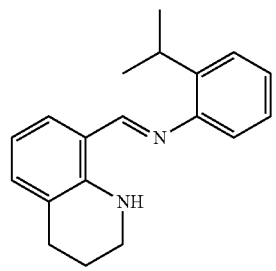

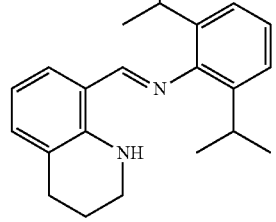

The general preparation method for the compound of the Chemical Formula 1 is given as follows:

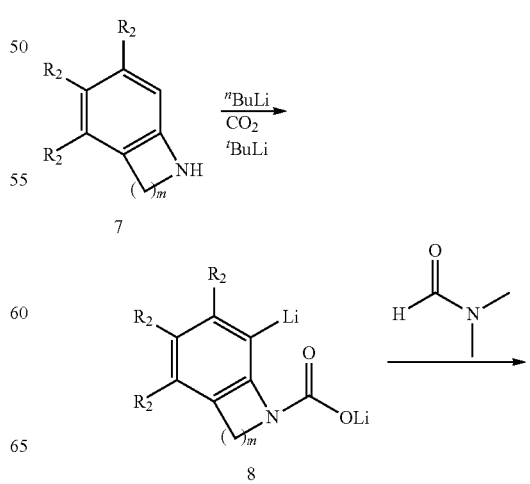

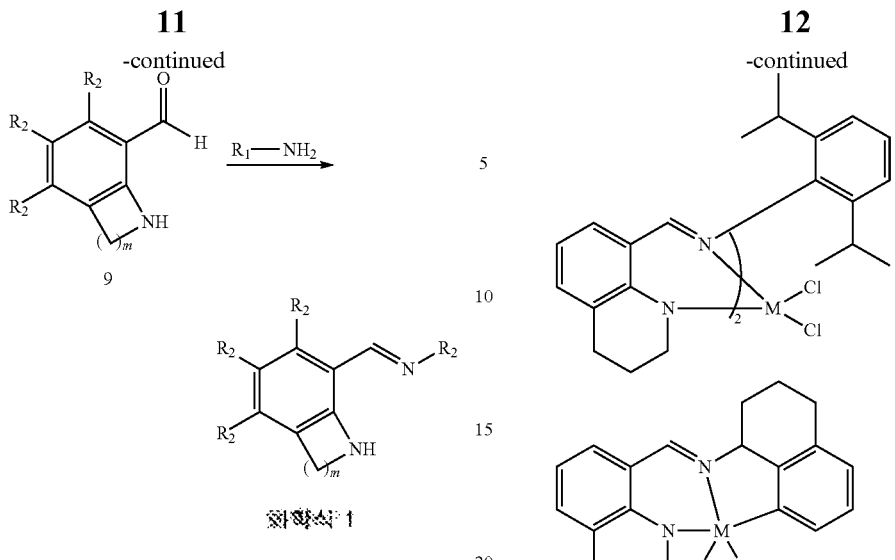

In the preparation method for the compound of the Chemical Formula 1, $R^1$ and $R^2$ are as defined in the Chemical Formula 1. In the preparation method, compound 7 can be used as a starting material to synthesize intermediate 8 by selective lithium substitution, and then DMF (N,N-dimethyl formamide) is added to obtain compound 9. Subsequently, the compound 9 is reacted with $R^1$—$NH_2$ through reflux or agitation to yield a compound of the Chemical Formula 1. Particularly, when $R^1$ in $R^1$—$NH_2$ is aryl, reflux is carried out overnight after an addition of 4A MS to yield the final product; or when $R^1$ is alkyl or alkylaryl, agitation is carried out overnight at the room temperature.

Depending on the type of $R^1$, the compound of the Chemical Formula 1 can be a ligand compound (e.g., NN chelate) having two chelating points with a metal or a ligand compound (e.g., NNN, NNO, or NNC chelate) having at least three chelating points with a metal.

The preparation method for the olefin block copolymer uses, as a catalyst, a transition metal compound having the compound of the Chemical Formula 1 as a ligand forming a coordination bond to a Group IV transition metal, the specific examples of which may include Ti, Zr, or Hf.

The transition metal compound can be represented by, if not specifically limited to, any one of the following structural formulas:

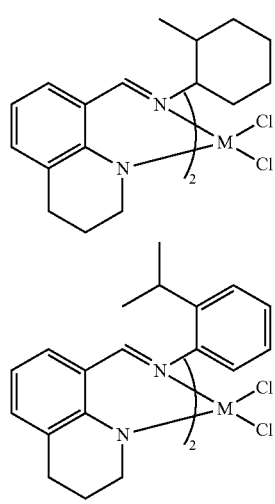

In the structural formulas, M is a Group IV transition metal; and Rs are the same or different from one another and independently selected from the group consisting of hydrogen, deuterium, halogen, nitrile, acetylene, amine, amide, ester, ketone, $C_1$-$C_{20}$ alkyl, $C_2$-$C_{20}$ alkenyl, $C_6$-$C_{20}$ aryl, $C_4$-$C_{20}$ heterocyclic, $C_1$-$C_{20}$ alkoxy, and $C_6$-$C_{20}$ aryloxy.

As can be seen from the structural formulas, the transition metal compound may have a structure that the mole ratio of the ligand to the transition metal is 2:1 or 1:1. Such a structural characteristic contributes to a relatively high content of the transition metal in the transition metal compound.

According to one example of the present invention, the transition metal compound may be prepared by the method given as follows. Firstly, a defined amount of a ligand represented by the Chemical Formula 1 and 1.05 equivalent of a metal precursor are mixed together, and an appropriate amount of a toluene solvent is added to the mixture at about −75 to −80° C. The resultant mixture is then slowly heated up to the room temperature and stirred for 6 to 24 hours. Subsequently, the solvent is removed to yield a desired transition metal compound; or if the added amount of the solvent is known, the desired transition metal compound is obtained in the solution phase.

The preparation method for the olefin block copolymer may use a compound of the Chemical Formula 2 as a catalyst, in addition to the transition metal compound derived from the Chemical Formula 1. Such a compound of the Chemical Formula 2 can be obtained by a known method as disclosed in, for example, Korean Patent Publication No. 0820542.

The compound of the Chemical Formula 2 can be a compound represented by the following Chemical Formula 2-1 in consideration of the electronic and stereoscopic environments around the metal in the Chemical Formula 1:

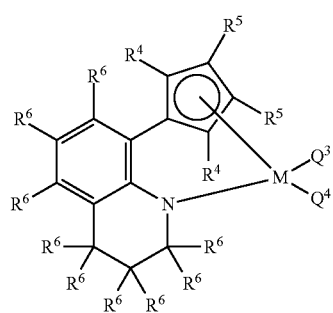

[Chemical Formula 2-1]

In the Chemical Formula 2-1, $R^4$ and $R^5$ are independently hydrogen, $C_1$-$C_{20}$ alkyl, $C_6$-$C_{20}$ aryl, or silyl; each Ws are independently $C_1$-$C_{20}$ alkyl, $C_6$-$C_{20}$ aryl, $C_2$-$C_{20}$ alkenyl, $C_7$-$C_{20}$ alkylaryl, $C_7$-$C_{20}$ arylalkyl, $C_1$-$C_{20}$ alkoxy, $C_6$-$C_{20}$ aryloxy, or amido, where at least two $R^6$s are linked to each other to form an aliphatic or aromatic ring; $Q^3$ and $Q^4$ are independently halogen, $C_1$-$C_{20}$ alkyl, $C_6$-$C_{20}$ arylamido, $C_2$-$C_{20}$ alkenyl, or $C_6$-$C_{20}$ aryl, and M is a Group IV transition metal.

The compound of the Chemical Formula 2 or 2-1 has the amido group linked to the amino or alkoxy group via a phenylene bridge to form a narrow angle of Cp-M-E and a wide angle of $Q^1$-M-$Q^2$ or $Q^3$-M-$Q^4$ to which monomers are accessible. This allows bulky monomers to gain easy access to the compound. Such a structural characteristic makes the compound of the Chemical Formula 2 or 2-1 prefer involving polymerization and coupling of α-olefin rather than ethylene or propylene and contribute to formation of a soft segment. Contrarily, the transition metal compound derived from the ligand of the Chemical Formula 1 contributes to formation of a hard segment.

Unlike the silicone-bridged CGC structure, the compound of the Chemical Formula 2 or 2-1 may form a stable and rigid six-membered ring structure having a metal linked to a nitrogen via, for example, a phenylene bridge. Such a compound is activated through reaction with a cocatalyst such as methyl aluminoxane or $B(C_6F_5)_3$ and then applied to a polymerization of olefin, thereby producing an olefin block copolymer characterized by high activity, high molecular weight, and high copolymerizability even at high polymerization temperature.

The catalyst composition may further comprise at least one cocatalyst compound selected from the group consisting of the compounds represented by the following Chemical Formula 3, 4 or 5, in addition to the two cocatalysts (transition metal compounds):

$J(R^{4'})_3$ [Chemical Formula 3]

In the Chemical Formula 3, J is aluminum (Al) or boron (B); and $R^{4'}$s are independently a halogen or a halogen-substituted or unsubstituted $C_1$-$C_{20}$ hydrocarbyl radical.

$[L-H]^+[ZA_4]^-$ or $[L]^+[ZA_4]^-$ [Chemical Formula 4]

In the Chemical Formula 4, L is a neutral or cationic Lewis acid; H is hydrogen; Z is a Group 13 element, and As are independently $C_6$-$C_{20}$ aryl or $C_1$-$C_{20}$ alkyl in which at least one hydrogen is substituted by a halogen, a $C_1$-$C_{20}$ hydrocarbyl group, a $C_1$-$C_{20}$ alkoxy group, or a phenoxy group.

—$[Al(R^{5'})—O]_a$— [Chemical Formula 5]

In the Chemical Formula 5, $R^{5'}$ is a halogen or a halogen-substituted or unsubstituted $C_1$-$C_{20}$ hydrocarbyl radical; and a is an integer of 2 or greater.

In this regard, the compound of the Chemical Formula 3 may be an alkyl metal compound without any limitation, the specific examples of which may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, tributylboron, and so forth.

The specific examples of the compound of the Chemical Formula 4 may include triethylammonium tetra(phenyl) boron, tributylammonium tetra(phenyl) boron, trimethylammonium tetra(phenyl) boron, tripropylammonium tetra(phenyl) boron, trimethylammonium tetra(p-tolyl) boron, trimethylammonium tetra(o,p-dimethylphenyl) boron, tributylammonium tetra(p-trifluoromethylphenyl) boron, trimethylammonium tetra(p-trifluoromethylphenyl) boron, tributylammonium tetra(pentafluorophenyl) boron, N,N-diethylanilinium tetra(phenyl) boron, N,N-diethylanilinium tetra(pentafluorophenyl) boron, diethylammonium tetra(pentafluorophenyl) boron, trimethylphosphonium tetra(phenyl) boron, triethylammonium tetra(phenyl) aluminum, tributylammonium tetra(phenyl) aluminum, trimethylammonium tetra(phenyl) aluminum, tripropylammonium tetra(phenyl) aluminum, trimethylammonium tetra(p-tolyl) aluminum, tripropylammonium tetra(p-tolyl) aluminum, triethylammonium tetra(o,p-dimethylphenyl) aluminum, tributylammonium tetra(p-trifluoromethylphenyl) aluminum, trimethylammonium tetra(p-trifluoromethylphenyl) aluminum, tributylammonium tetra(pentafluorophenyl) aluminum, N,N-diethylanilinium tetra(pentafluorophenyl) aluminum, diethylammonium tetra(pentafluorophenyl) aluminum, triphenylphosphonium tetra(phenyl) aluminum, trimethylphosphonium tetra(phenyl) aluminum, tripropylammonium tetra(p-tolyl) boron, triethylammonium tetra(o,p-dimethylphenyl) boron, trimethylammonium tetra(o,p-dimethylphenyl) boron, tributylammonium tetra(p-trifluoromethylphenyl) boron, trimethylammonium tetra(p-trifluoromethylphenyl) boron, tributylammonium tetra(pentafluorophenyl) boron, N,N-diethylanilinium tetra(phenyl) boron, triphenylphosphonium tetra(phenyl) boron, triphenylcarbonium tetra(p-trifluoromethylphenyl) boron, triphenylcarbonium tetra(pentafluorophenyl) boron, trityl tetra(pentafluorophenyl) boron, dimethylanilinium tetrakis(pentafluorophenyl) borate, trityltetrakis(pentafluorophenyl) borate, and so forth.

The compound of the Chemical Formula 5 may be an alkylaluminoxane without any limitation, the specific examples of which may include methylaluminoxane, ethylaluminoxane, isobutylaluminoxane, butylaluminoxane, and so forth.

The added amount of the cocatalyst compound may be given so that the mole ratio of the cocatalyst with respect to the transition metal compound derived from the Chemical Formula 1 or the compound represented by the Chemical Formula 2 (hereinafter, referred to as "main catalyst compound") is about 1:1 to 1:20, such as, for example, about 1:1 to 1:18, or about 1:1 to 1:15. To acquire the effect of the cocatalyst compound to a defined level or above, the cocatalyst may be added so that the mole ratio of the cocatalyst compound with respect to the main catalyst compound is 1:1 or greater. Further, the cocatalyst compound may be used so that the mole ratio of the cocatalyst compound with respect to the main catalyst compound is 1:20 or less, in order to properly control the properties of the block copolymer product and effectively activate the main catalyst compound.

The catalyst compound may further comprise a polymerization aid. The polymerization aid may be at least one compound selected from the group consisting of an aluminum compound containing a $C_1$-$C_{12}$ hydrocarbyl substituent, a zinc compound containing a $C_1$-$C_{12}$ hydrocarbyl substituent, and a gallium compound containing a $C_1$-$C_{12}$ hydrocarbyl substituent. Specific examples of the polymerization aid may include triethylaluminum or diethylzinc.

The polymerization aid plays a role to enhance the degree of blocking and the crystallinity of the molecular structure and increase the content of the α-olefin repeating unit to produce a block copolymer with low density and high melting temperature. This is because the polymerization aid enables alternating actions of the transition metal compound derived from the Chemical Formula 1 and the compound of the Chemical Formula 2 and helps alternately forming a plurality of segments constituting the olefin block copolymer, that is, for example, hard and soft segments. In other words, such an action of the polymerization aid makes it possible to produce an olefin block copolymer with a higher degree of blocking and hence higher melting temperature and higher heat resistance.

The added amount of the polymerization aid may be given to have the mole ratio of the polymerization aid with respect to the main catalyst compound in the range of about 1:10 to 1:1,000, such as, for example, about 1:10 to 1:500, or about 1:20 to 1:200.

In other words, the content of the polymerization aid may be given to have the mole ratio of the polymerization aid with respect to the main catalyst compound in the range of 1:10 or greater in view of providing the effect of the polymerization aid to a defined level or above; and 1:1,000 or less in consideration of properly controlling the properties of the block copolymer product and providing high activity of the main catalyst compound.

According to the above-described preparation method of the another embodiment, the olefin block copolymer can be prepared by a method that includes the step of copolymerizing monomers comprising ethylene or propylene and α-olefin in the presence of the aforementioned catalyst composition. In this regard, specific examples of the α-olefin monomer may include 1-butene, 1-pentene, 4-methyl-1-pentene, 1-hexene, 1-heptene, 1-octene, 1-decene, 1-undecene, 1-dodecene, 1-tetradecene, 1-hexadecene, and 1-itocene.

The copolymerization step may be carried out at a temperature of about 140° C. or higher, about 140 to 180° C., or about 140 to 160° C., and under the pressure of about 50 bar or higher, about 50 to 120 bar, or about 70 to 100 bar. The conventional metallocene or post-metallocene catalysts are known to have an abrupt drop in their activity at high temperature. Contrarily, the main catalyst compounds contained in the aforementioned catalyst composition can maintain good activity even under conditions including a temperature of about 140° C. or higher and a pressure of about 50 bar or higher. Accordingly, the copolymerization process can be carried out under such high-temperature and high-pressure conditions to acquire a block copolymer with high molecular weight and good properties with more efficiency.

On the other hand, the block copolymer of the embodiment can be prepared by copolymerization according to the typical preparation conditions for olefin copolymers, except for the above-stated conditions and catalyst composition. The specific example of the copolymerization conditions is described in the after-mentioned examples.

As described above, the present invention provides an olefin block copolymer with good elasticity as well as enhanced heat resistance and a preparation method for the olefin block copolymer. Particularly, such an olefin block copolymer can not only be prepared by a simple process but exhibit good processability.

Thus the olefin block copolymer is able to support the load of electronic appliances such as TVs or laptop computers while maintaining its original shape and elasticity in spite of the high temperature caused by the heat generated from the electronic appliances. Accordingly, the olefin block copolymer and the sheet-shaped molded body comprising the olefin block copolymer can be used in a variety of applications as a substitute for rubber materials to form nonslip pads, overcoming the problems with the conventional olefin-based elastomers.

EXAMPLES

Hereinafter, some examples will be given for better understanding of the present invention, but the following examples are presented only for a mere illustration though, and the scope of the present invention should not be construed to be defined thereby.

In the following examples, organic reagents and solvents as used herein are purchased from Aldrich Chemical Company Inc. and Merck Chemicals Co., Ltd. and purified according to the standard methods. In all the steps of synthesis, a contact with air and water was avoided to enhance the reproducibility of the experiments. To identify the structure of a chemical, 400 MHz nuclear magnetic resonance (NMR) and X-ray spectroscopic instruments were used to obtain the respective spectra and diagrams.

The term "overnight" as used herein refers to approximately 12 to 16 hours, and the term "room temperature" as used herein refers to the temperature of 20 to 25° C. The synthesis of all the transition metal compounds and the preparation of experiments were carried out using the dry box technique or glass tools maintained in dry condition under the dry nitrogen atmosphere. All the solvents used in the examples were of the HPLC level and dried before use.

Preparation Example 1

Preparation of (E)-N-((1,2,3,4-tetrahydroquinolin-8-yl)methylene)-2-methylcyclohexanamine 1.06 g of tetrahydroquinolino aldehyde was dissolved in 17 mL of methanol, and 1.3 mL of 2-methylcyclohexyl amine was slowly added. After agitated overnight at the room temperature, the resultant solution was removed of the solvent under reduced pressure and then dissolved in hexane again to prepare a thick solution, which was stored in a freezer. This solution contained two stereoscopic isomer products at a ratio of about 1.5:1. After about 2 days, a white crystalline solid appeared in the solution. The same procedures were performed on the remaining store solution to collect a solid, which was washed with cold methanol and hexane and dried to yield pure stereoscopic isomer products (yield: 50%).

1H NMR (500 MHz, d-toluene): 0.83 (d, J=7 Hz, 3H, CH$_3$), 0.95-1.01 (m, 1H, CH), 1.20-1.29 (m, 2H, CH$_2$), 1.52-1.71 (m, 8H, CH$_2$), 2.09-2.10 (m, d-tol), 2.38-2.43 (m, 1H, CH), 2.51-2.53 (m, 2H, CH$_2$), 3.12-3.13 (m, 2H, CH$_2$), 6.55 (t, J=7.5 Hz, 1H, phenyl), 6.83 (d, J=7.5 Hz, 1H, phenyl), 6.97-7.01 (m, 1H, phenyl, d-tol), 7.10 (s, d-tol), 8.16 (s, 1H, CH), 9.27 (b, 1H, NH).

Preparation Example 2

Preparation of Zirconium Catalyst I 145 mg of the ligand compound prepared in the Preparation Example 1 and 231 mg of zirconium benzyl were subjected to sampling in a globe box and then put into a Schlenk flask. The Schlenk flask was taken out and cooled down to −78° C. With the temperature maintained, 12 mL of toluene was slowly added to the resultant solution, which was then gradually heated up to the room temperature and agitated for 6 hours to obtain a thick orange-colored toluene solution. The solution was removed of the solvent to yield a pure product.

1H NMR (500 MHz, d-toluene): 1.09-1.13 (m, 1H, CH$_3$), 1.50-1.61 (m, 1H, CH$_2$), 1.65-1.75 (m, 4H, CH$_2$), 2.31 (d, J=10.5 Hz, 1H, CH$_2$Ph), 2.49-2.61 (m, 6H, CH$_2$ and CH$_2$Ph), 2.67 (d, J=10.5 Hz, 1H, CH$_2$Ph), 3.18-3.24 (m, 1H, CH$_2$), 3.56-3.62 (m, 1H, CH$_2$), 4.30-4.34 (m, 1H, CH), 6.55-7.23 (m, 15H, phenyl), 7.97 (s, 1H, 이민 CH), 8.13 (d, J=7 Hz, 1H, phenyl).

Preparation Example 3

Preparation of Zirconium Catalyst II 90 mg of the ligand compound prepared in the Preparation Example 1 and 169 mg of zirconium benzyl were subjected to sampling in a globe box and then put into a Schlenk flask. The Schlenk flask was taken out and cooled down to −78° C. With the temperature maintained, 10 mL of toluene was slowly added to the resultant solution, which was then gradually heated up to the room temperature and agitated for 2 days to obtain a thick orange-colored toluene solution as a product solution.

1H NMR (500 MHz, d-toluene): 0.41 (d, J=7 Hz, 3H, CH$_3$), 0.83-1.03 (m, 4H, CH$_2$), 1.18-1.31 (m, 2H, CH$_2$), 1.40-1.62 (m, 5H, CH$_2$), 1.83-1.88 (m, 1H, CH), 2.05-2.12 (m, d-tol, CH$_2$), 2.47-2.55 (m, 8H, CH$_2$), 3.21-3.25 (m, 1H, CH), 3.38-3.41 (m, 1H, CH), 3.79-3.83 (m, 1H, CH), 6.58 (t, J=7.5 Hz, 1H, phenyl), 6.82-7.12 (m, phenyl, d-tol), 8.07 (s, 1H, CH).

Comparative Examples 1 and 2 and Examples 1 to 10

Preparation of Ethylene/1-octene Block Copolymer

Under the pressure of 89 bar, 1-octene and ethylene as monomers and a hexane solvent (3.20 kg/h) were fed into a 1.5 L continuous stirred tank reactor preheated up to 100 to 150° C. Into the reactor were fed a catalyst A, a catalyst B, and a dimethylanilinium tetrakis(pentafluorophenyl) borate cocatalyst from a catalyst storage tank and then added a scavenger (TIBAL) and diethyl zinc to activate a copolymerization reaction. The scavenger was first mixed with reactants in order to eliminate impurities potentially contained in the reactants and then fed into the reactor. In the Examples, the polymerization reaction was carried out at a relatively high temperature of 140 to 150° C., and the polymer solution resulting from the copolymerization reaction was transferred into a solvent separator to remove most of the solvent. The resultant solution was passed through a cooling water and a cutter to yield a granulated polymer product. The polymerization conditions for ethylene and 1-octene according to the Comparative Examples 1 and 2 and Examples 1 to 10 are presented in the following Table 1.

[Catalyst A]

The catalyst A compound as used in the following Examples and Comparative Examples was (E)-N-((1,2,3,4-tetrahydroquinolin-8-yl)methylene)-2-methylcyclohexanamine zirconium benzyl as prepared in the Preparation Example 2.

[Catalyst B]

The catalyst B compound as used in the following Examples and Comparative Examples was 1,2,3,4-tetrahydro-8-(2,3,4-trimethyl-5-methylenecyclopenta-1,3-dienyl) quinolone dimethyl titanium as prepared in the example of Korean Patent Publication No. 0820542.

TABLE 1

|  | Comparative Example | |
|---|---|---|
|  | 1 | 2 |
| Polymerization temperature (° C.) | 135 | 168 |
| Catalyst A (μmol/hr) | 18 | — |
| Catalyst B (μmol/hr) | — | 18 |
| Ethylene (kg/hr) | 0.63 | 0.63 |
| 1-octene (kg/hr) | 0.60 | 0.60 |
| Cocatalyst (μmol/hr) | 90 | 90 |
| Scavenger (ml/hr) (10 mM) | 3.5 | 3.5 |
| Diethyl zinc (ml/hr) (10 mM) | — | — |
| Hydrogen (L/hr) | — | — |

|  | Example | | | | | | | | | |
|---|---|---|---|---|---|---|---|---|---|---|
|  | 1 | 2 | 3 | 4 | 5 | 6 | 7 | 8 | 9 | 10 |
| Polymerization temperature (° C.) | 145 | 141 | 143 | 143 | 140 | 142 | 149 | 144 | 145 | 142 |
| Catalyst A (μmol/hr) | 18 | — | 18 | 18 | 18 | 18 | 18 | 18 | 18 | 18 |
| Catalyst B (μmol/hr) | 6 | 6 | 6 | 6 | 6 | 6 | 6 | 6 | 6 | 6 |
| Ethylene (kg/hr) | 0.63 | 0.63 | 0.63 | 0.63 | 0.73 | 0.58 | 0.68 | 0.68 | 0.63 | 0.63 |

TABLE 1-continued

|  |  |  |  |  |  | Comparative Example | | | |
|---|---|---|---|---|---|---|---|---|---|
| 1-octene (kg/hr) | 0690 | 0.75 | 0.67 | 0.90 | 0.75 | 0.60 | 0.60 | 0.90 | 0.75 | 0.60 |
| Cocatalyst (μmol/hr) | 120 | 120 | 120 | 120 | 120 | 120 | 120 | 120 | 120 | 120 |
| Scavenger (ml/hr) (10 mM) | 3.5 | 3.5 | 3.5 | 3.5 | 3.5 | 3.5 | 3.5 | 3.5 | 3.5 | 3.5 |
| Diethyl zinc (ml/hr) (10 mM) | 3.5 | 3.5 | 3.5 | 3.5 | 3.5 | 3.5 | 3.5 | 3.5 | 3.5 | 3.5 |
| Hydrogen (L/hr) | — | — | — | — | — | — | — | — | 1.0 | 1.5 |

Experimental Example 1

The block copolymers prepared in Examples 1 to 10 were molded into a sheet-shaped sample (2 mm thick and 100×100 mm² in area) and positioned between two top and bottom glass substrates, and heated up to 60° C. A load of 5 kg was uniformly applied on the sample for 24 hours, and the sample was then removed from the glass substrates. After removal of the load, the sample was examined to determine its recovery in thickness by measuring the thickness T. As the thickness T was in the range of 0.8 to 2.0 mm, the sample proved to satisfy the Mathematical Formula 1 (i.e., $60\% \geq \{(T_0-T)T_0\} \times 100$). In contrast, the measurement results of thickness for the Comparative Examples 1 and 2 were 0.3 to 0.7 mm, not satisfying the Mathematical Formula 1 given by $60\% \geq \{(T_0-T)T_0\} \times 100$. The measurement values of the Mathematical Formula 1 for Examples 1 to 10 and Comparative Examples 1 and 2 are presented in Table 2.

Experimental Example 2

The copolymers prepared in the Examples and Comparative Examples were evaluated in regards to properties according to the methods as described below. The evaluation results are presented in Tables 2 and 3.

1) Analysis on the Content of the Hard Segment

The content of the hard segment in Examples and Comparative Examples was calculated using the time domain NMR instrument (TD NMR; Minspec™ manufactured by Optics) commercially available. Firstly, the TD NMR instrument was adopted to measure the FDI (Free Induction Decay) for the samples of the Examples and the Comparative Examples. The measurement results were as depicted, for example, in Figure 3. FID is the function of time and intensity. The four constants, such as A, B, $T2_{fast}$, and $T2_{slow}$, in the following Formula 3 were varied to elicit a functional formula most approximating the FID functional graph, thereby determining A, B, $T2_{fast}$, and $T2_{slow}$ values of each sample.

It is known that the T2 (spin-spin relaxation time) relaxation for the hard segment as calculated from the functional formula appears fast, while the T2 relaxation for the soft segment is slow. Hence, among the calculated values of A, B, $T2_{fast}$, and $T2_{slow}$, the lower T2 value was determined as the T2 value of the hard segment, that is, $T2_{fast}$, while the higher T2 value was determined as the T2 value of the soft segment, that is, $T2_{slow}$. Through this procedure, the content (wt. %) of the hard segment as well as the constants of A and B was calculated.

$$\text{Intensity} = A \times \text{EXP}(-\text{Time}/T2_{fast}) + B \times \text{EXP}(-\text{Time}/T2_{slow})$$  [Mathematical Formula 3]

Determine A, B, $T2_{fast}$, and $T2_{slow}$ by fitting.

Hard segment (wt. %) = $A/(A+B) \times 100$

In the Mathematical Formula 3, intensity and time are values calculated through the FID analysis; $T2_{fast}$ is the T2 (spin-spin relaxation time) relaxation value for the hard segment; and $T2_{slow}$ is the T2 (spin-spin relaxation time) relaxation value for the soft segment. A and B, which are constants determined by the fitting process, indicate the relative proportions of the hard and soft segments, respectively, and have values proportionate to the contents of the respective segments.

2) Analysis on the Content of the Ethylene Repeating Unit

The copolymers of Examples and Comparative Examples were analyzed in regards to the content of the ethylene repeating unit by using $^{13}$C-NMR spectroscopy.

3) MI (Melt Index)

The copolymers of the Examples and Comparative Examples were measured in regards to melt index (MI) according to the ASTM D-1238 (conditions E, 190° C., load of 2.16 kg).

4) Density

Each copolymer of the Examples and Comparative Examples was molded into a sample in the form of a sheet (3 mm thick and 2 cm in radius) using a press mold (180° C.) and measured in regards to the density with a Mettler scale at a rate of 10° C./min.

5) Melting Temperature (Tm)

The copolymer sample was heated up to 200° C., maintained at the temperature for 5 minutes, cooled down to 30° C., and then heated up again. In the measurement results from DSC (Differential Scanning Calorimeter, manufacture by TA Instruments), the top of the heat flow curve was determined as the melting temperature. In this regard, the heating/cooling rate was 10° C./min, and the measurement results obtained in the second heating interval were used to determine the melting temperature.

6) Crystallization Temperature (Tc)

A heat flow curve was obtained by decreasing the temperature using a DSC (Differential Scanning Calorimeter, manufactured by TA Instruments) under the same conditions for determination of the melting temperature. The top of the heat flow curve was determined as the crystallization temperature.

7) PDI (PolyDispersity Index): Weight Average Molecular Weight and Molecular Weight Distribution GPC (Gel Permeation Chromatography) was adopted to measure the number average molecular weight (Mn) and the weight average molecular weight (Mw), and the weight average molecular weight was divided by the number average molecular weight to calculate the molecular weight distribution.

8) TMA (Thermal Mechanical Analysis)

A sample penetration testing (under the force of 0.5 N) was carried out using TMA Q400 manufactured by TA Instruments, where the temperature was raised from 25° C. at a rate of 5° C./min. The distance of the TMA probe from the sample was measured as a function of temperature, and the temperature when the probe was 1 mm distant from the sample was considered as the test value.

9) Permanent Recovery

A universal testing machine manufactured by Zwick was employed to measure the permanent recovery after 300% elongation for the sample according to the ASTM D638.

10) Hardness Shore A

An Asker hardness tester manufactured by Kobunshi Keiki Co., Ltd. was used to make a sample and measure the Shore hardness of the sample according to the ASTM D2240 standards.

TABLE 2

|  | Value of mathematical formula 1 | Content of hard segment (wt. %) | Content of ethylene (wt. %) | Mw | PDI | Tm (° C.) | Tc (° C.) |
| --- | --- | --- | --- | --- | --- | --- | --- |
| Comparative Example 1 | Immeasurable | Immeasurable | 97 | 140,500 | 2.4 | 128 | 109 |
| Comparative Example 2 | Melt down | Immeasurable | 65 | 89,000 | 2.5 | 58 | 55 |
| Example 1 | 10 | 42 | 69 | 122,800 | 2.5 | 122 | 99 |
| Example 2 | 10 | 36 | 68 | 118,500 | 2.4 | 123 | 101 |
| Example 3 | 8 | 39 | 69 | 114,300 | 2.5 | 124 | 101 |
| Example 4 | 21 | 34 | 63 | 103,200 | 2.5 | 123 | 101 |
| Example 5 | 8 | 48 | 72 | 130,400 | 2.6 | 123 | 102 |
| Example 6 | 9 | 46 | 73 | 121,400 | 2.5 | 124 | 101 |
| Example 7 | 7 | 48 | 73 | 123,200 | 2.5 | 124 | 101 |
| Example 8 | 20 | 35 | 66 | 109,400 | 2.5 | 124 | 101 |
| Example 9 | 18 | 35 | 66 | 911,700 | 2.8 | 124 | 102 |
| Example 10 | 15 | 35 | 69 | 81,500 | 2.9 | 123 | 103 |

For the Comparative Example 1 (i.e., a polymer of ethylene only not including a plurality of blocks or segments distinguishable) and the Comparative Example 2 (i.e., a random copolymer of ethylene and 1-octene), a plurality of blocks or segments distinguishable by properties were impossible to define, so the hard segment content for the copolymers was immeasurable or technically pointless.

The sample of Comparative Example 1 had no change in thickness under the load of 5 kg for 24 hours in the Experimental Example 1 and exhibited no elasticity at all, so the measurement value of the Mathematical Formula 1 was impossible to determine. The sample of Comparative Example 2 melted down under the measurement condition of the Experimental Example 1 (i.e., 60° C.), so the measurement value of the Mathematical Formula 1 was impossible to determine.

TABLE 3

|  | Density (g/cm³) | MI (g/10 min) | TMA (° C.) | Permanent recovery (%) | Hardness Shore A |
| --- | --- | --- | --- | --- | --- |
| Comparative Example 1 | 0.928 | 0.6 | — | — | — |
| Comparative Example 2 | 0.870 | 3.6 | 60 | 160 | 59 |
| Example 1 | 0.877 | 0.5 | 114 | 45 | 80 |
| Example 2 | 0.873 | 0.7 | 111 | 35 | 75 |
| Example 3 | 0.876 | 0.7 | 114 | 35 | 80 |
| Example 4 | 0.869 | 1.8 | 98 | 20 | 66 |
| Example 5 | 0.881 | 0.5 | 117 | 40 | 83 |
| Example 6 | 0.880 | 0.6 | 116 | 45 | 81 |
| Example 7 | 0.881 | 0.4 | 119 | 40 | 84 |
| Example 8 | 0.871 | 1.0 | 104 | 20 | 72 |
| Example 9 | 0.872 | 2.9 | 111 | 30 | 75 |
| Example 10 | 0.877 | 3.6 | 113 | 50 | 80 |

As can be seen from Tables 2 and 3, the block copolymers of the Examples of which the value of the Mathematical Formula 1 was 60% or less proved to include a plurality of soft and hard segments and have a blocked characteristic. Such block copolymers of the Examples showed excellent elasticity pertaining to a lower value of permanent recovery in comparison with the polymer of the Comparative Example 1 or the random copolymer of the Comparative Example 2 in the similar density range. Furthermore, the block copolymers of the Examples had good heat resistance as demonstrated by high TMA value and high melting temperature. Contrarily, the random copolymer of the Comparative Example 2 was inferior in elasticity and heat resistance to the block copolymer of the Examples, and the polymer of the Comparative Example 1 had no elasticity at all.

What is claimed is:

1. An olefin block copolymer comprising a plurality of blocks or segments, each comprising an ethylene or propylene repeating unit and an α-olefin repeating unit at different weight fractions,
   wherein the olefin block copolymer satisfies the following Mathematical Formula 1 when a load of 5 to 10 kg is applied to a sheet-shaped molded body of the block copolymer having a thickness of 2 mm and an area of 100×100 mm² for 12 hours or longer at a temperature of 60° C. or higher, and then removed:

$$60\% \geq \{(T_0-T)/T_0\} \times 100\%$$ [Mathematical Formula 1]

wherein $T_0$ is the initial thickness of the sheet-shaped molded body of the block copolymer; and T is the thickness of the sheet-shaped molded body after removal of the load.

2. The olefin block copolymer as claimed in claim 1, wherein the olefin block copolymer comprises a hard segment comprising a first weight fraction of the α-olefin repeating unit and a soft segment comprising a second weight fraction of the α-olefin repeating unit,
   wherein the second weight fraction is greater than the first weight fraction.

3. The olefin block copolymer as claimed in claim 2, wherein the weight fraction of the α-olefin repeating unit contained in the entire block copolymer has a value between the first and second weight fractions.

4. The olefin block copolymer as claimed in claim 2, wherein the olefin block copolymer comprises 10 to 90 wt. % of the hard segment and a remaining content of the soft segment.

5. The olefin block copolymer as claimed in claim 2, wherein the hard segment has a higher value than the soft segment in at least one property of the degree of crystallization, density, and melting temperature.

6. The olefin block copolymer as claimed in claim 1, wherein the olefin block copolymer comprises 30 to 90 wt. % of the ethylene or propylene repeating unit and a remaining content of the α-olefin repeating unit.

7. The olefin block copolymer as claimed in claim 1, wherein the olefin block copolymer has a density of 0.85 to 0.92 g/cm$^3$.

8. The olefin block copolymer as claimed in claim 1, wherein the olefin block copolymer has a melt index of 0.5 to 5 g/10 min under a load of 2.16 kg at 190° C. and a Shore hardness of 50 to 100.

9. The olefin block copolymer as claimed in claim 1, wherein the olefin block copolymer has a permanent recovery (after 300% elongation) of 100% or less.

10. The olefin block copolymer as claimed in claim 1, wherein the olefin block copolymer has a TMA (Thermal Mechanical Analysis) value of 70 to 140° C.

11. The olefin block copolymer as claimed in claim 1, wherein the olefin block copolymer has a melting temperature of 100 to 140° C.

12. The olefin block copolymer as claimed in claim 1, wherein the olefin block copolymer has a weight average molecular weight of 50,000 to 200,000 and a molecular weight distribution of 2.0 to 4.5.

13. A sheet-shaped molded body comprising the olefin block copolymer as claimed in claim 1.

14. The sheet-shaped molded body as claimed in claim 13, wherein the sheet-shaped molded body is used for a nonslip pad.

* * * * *